May 17, 1932.  J. W. MARTIN  1,858,713
TRAP SET
Filed March 3, 1931
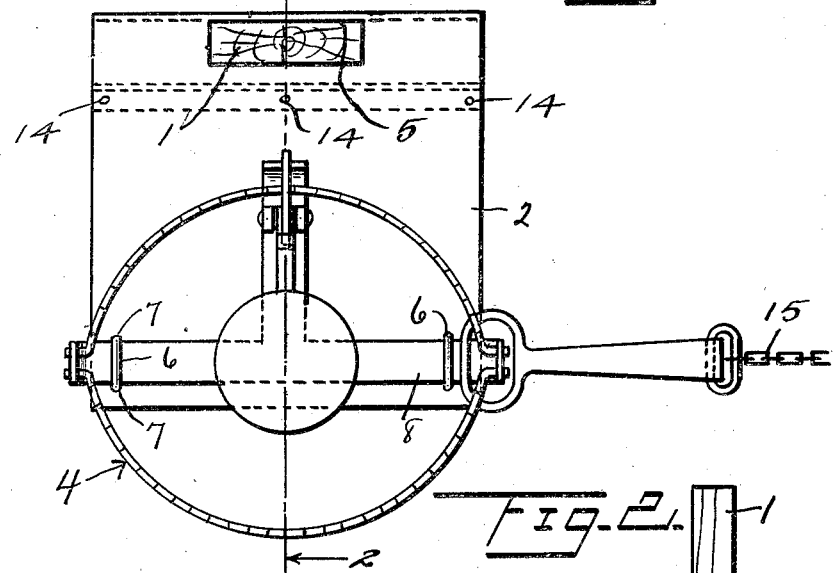
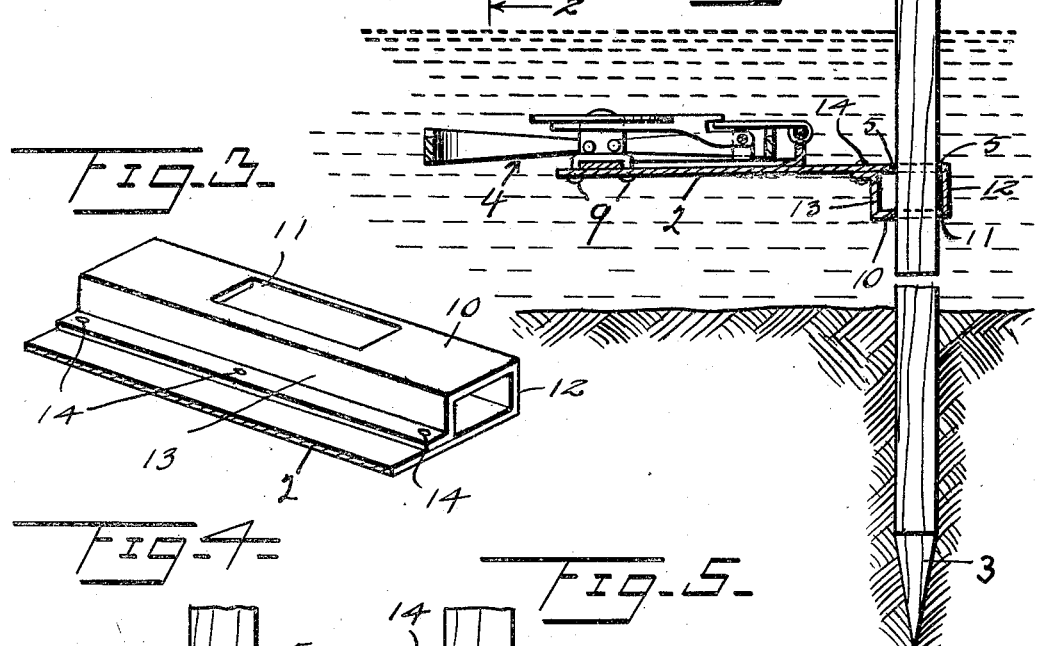
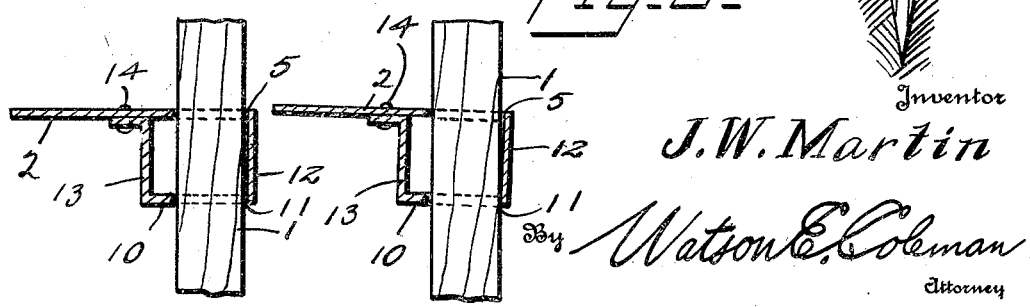
Inventor
J. W. Martin
By Watson E. Coleman
Attorney Patented May 17, 1932

1,858,713

UNITED STATES PATENT OFFICE

JOHN W. MARTIN, OF AMORITA, OKLAHOMA

TRAP SET

Application filed March 3, 1931. Serial No. 519,837.

This invention relates to a set for traps of that type used for catching those fur bearing animals that live in or frequent the water and that live along the shores of streams, lakes and the like.

The invention has for one of its objects to provide a novel device of the character stated which shall be adapted to support a trap above, in alinement with or at any point below the surface of a stream, lake or the like, and which shall be adapted to support the trap in such manner that the flouncing of the trapped animal will cause the movement of the trap downwardly from its set position so as to drown the animal.

To attain the foregoing and other objects, the nature of which will appear as the description proceeds, the invention comprehends the provision of a trap set which shall embody a stake adapted to be partly driven in the bottom of a stream, lake or the like, a plate carrying the trap and mounted on the stake for adjustment with respect thereto to position the trap above, in alinement with or below the surface of the water, and means carried by the plate and cooperating with the stake to normally support the plate in its adjusted position and adapted, when the plate is vibrated by the flouncing of the trapped animal, to release the plate for downward movement and thus effect the drowning of the animal.

The invention is hereinafter more fully described and claimed, and illustrated in the accompanying drawings, wherein:—

Figure 1 is a top plan view of the trap set with the jaws of the trap latched in opened position.

Figure 2 is a sectional view taken on the vertical plane indicated by the line 2—2 of Figure 1 with the set and trap in operative position in a body of water.

Figure 3 is a perspective view of a fragmentary portion of the trap carrying plate of the set.

Figure 4 is a view partly in side elevation and partly in vertical section illustrating the manner in which the clutch elements cooperate with the stake to hold the plate against accidental downward movement on the stake, and Figure 5 is a similar view illustrating the manner in which the clutch elements cooperate with the stake to hold the plate against accidental upward movement on the stake.

Referring in detail to the drawings, 1 designates the stake and 2 the plate of the trap set. The stake 1 is preferably made from wood, and is adapted to have its pointed lower end 3 driven into the bottom of a stream, lake or the like. The plate 2 which is preferably made of metal, carries a jaw trap 4, and is mounted on the stake 1 for adjustment vertically thereon to position the trap above, in alinement with or below the surface of the water. The stake 1 may be of angular or other formation in cross section, and the plate 2 may be of angular or other formation in plan.

The plate is connected near one edge thereof to the stake 1, and it is provided near this or the rear edge thereof with an opening 5 for the reception of the stake. The plate 2 is provided near its other or front edge with clips 6 which serve to secure the trap 4 upon the upper side of the plate. The clips 6 pass through openings 7 formed in the front end of the plate 2, and embrace the base 8 of the trap 4. The clips 6 are secured to the plate 2 by elements 9, the connection between the clips and plate permitting the removal of the trap 4 when desired.

The plate 2 is provided with a bar 10 which underlies and is arranged in parallel relation to the rear edge portion of the plate and which is provided with an opening 11 registering with the opening 5 of the plate. Flanges 12 and 13 support the bar 10 from the plate 2. The flange 12 is formed integrally with and extends downwardly from the rear edge of the plate 2, and the bar 10 is formed integrally with and extends forwardly from the lower edge of the flange 12. The flange 13 is formed integrally with and extends upwardly from the front edge of the bar 10, and is secured, as at 14, to the plate 2. The walls of the openings 5 and 11 constitute clutch elements, and such elements engage the stake 1 in such manner as to support the plate 2 against accidental downward movement from its adjusted position on the stake 1. When in adjusted position, the plate 2 extends forwardly and downwardly at a slight inclination from the stake 1. When the plate 2 is in this position, the front wall of the opening 5 and the rear wall of the opening 11 engage the stake 1 and support the plate against accidental downward movement on the stake. When it is desired to move the plate 2 upwardly or downwardly on the stake 1 it is only necessary to move the plate into such angular relation with respect to the stake that the clutch elements or walls of the openings 5 and 11 will occupy a parallel position with respect to the stake.

While the clutch elements cooperate with the stake 1 to support the plate 2 in its adjusted position on the stake, they will permit the plate to move downwardly on the stake during and as the result of the vibration of the flouncing of the trapped animal.

In practice, the stake 1 is driven into the bottom of a stream, lake or the like, and thereafter the plate 2 is applied to the stake with the jaws of the trap 4 latched in opened position. The plate 2 is then adjusted upon the stake 1 into a position which will support the trap 4 above, or in alinement with or at any point below the surface of the water. When an animal caught in the trap 4 begins flouncing about, the resulting vibrations imparted to the plate 2 will, together with the weight of the plate and animal, cause the plate to move downwardly on the stake 1 and thus carry the animal below the surface of the water with the result that it will be drowned. If desired, the set may be secured to the shore of the stream, lake or the like, and to permit this to be done the trap 4 is provided with a chain 15 which may be engaged with a stake, not shown, driven into the shore.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. In a device of the character set forth, a stake, a trap, a plate carrying the trap and provided with an opening to receive the stake, and a bar carried by the plate and provided with an opening registering with said first opening and to receive the stake, the walls of the openings constituting clutch elements engaging the stake to hold the plate in adjusted position on the stake, said clutch elements functioning to release the plate from the stake for downward movement when the plate is vibrated.

2. In a device of the character set forth, a stake, a trap, a plate carrying the trap and provided with an opening to receive the stake, a bar arranged in spaced relation to the plate and provided with an opening alining with said first opening to receive the stake, the walls of said openings constituting clutch elements to engage the stake to hold the plate in adjusted position thereon, and flanges securing the bar to and spacing it from the plate.

3. In a device of the character set forth, a stake, a trap, a plate carrying the trap and provided near one edge thereof with an opening to receive the stake, and a bar secured to and spaced from the plate near such edge thereof and provided with an opening registering with said first opening to receive the stake, the walls of said openings constituting clutch elements engaging the stake to hold the plate in adjusted position.

In testimony whereof I hereunto affix my signature.

JOHN W. MARTIN.